US 6,726,329 B2

(12) United States Patent
Li et al.

(10) Patent No.: US 6,726,329 B2
(45) Date of Patent: Apr. 27, 2004

(54) IMAGE PROJECTION DEVICE WITH AN INTEGRATED PHOTODIODE LIGHT SOURCE

(75) Inventors: Hsiao Yi Li, Taoyuan Sien (TW); Hung Lung Cheng, Taoyuan Sien (TW); He Chiang Liu, Taoyuan Sien (TW)

(73) Assignee: Delta Electronics Inc., Taoyuan Sien (TW)

( * ) Notice: Subject to any disclaimer, the term of this patent is extended or adjusted under 35 U.S.C. 154(b) by 0 days.

(21) Appl. No.: 10/298,437

(22) Filed: Nov. 18, 2002

(65) Prior Publication Data

US 2003/0117595 A1 Jun. 26, 2003

(30) Foreign Application Priority Data

Dec. 20, 2001 (TW) ......................... 90131751 A
Sep. 11, 2002 (TW) ......................... 91120765 A

(51) Int. Cl.[7] ........................... G03B 21/00; G03B 21/14
(52) U.S. Cl. ........................... 353/20; 353/31; 348/801; 345/46; 345/83
(58) Field of Search ............................... 353/20, 94, 31, 353/33; 348/742, 800, 801; 345/44, 45, 47, 82, 46, 50, 83; 349/8, 9

(56) References Cited

U.S. PATENT DOCUMENTS

| | | | | |
|---|---|---|---|---|
| 6,183,091 B1 | * | 2/2001 | Johnson et al. | ............... 353/20 |
| 6,407,766 B1 | * | 6/2002 | Ramanujan et al. | ........ 347/239 |
| 6,614,462 B1 | * | 9/2003 | Donner et al. | ............... 347/239 |
| 6,626,540 B2 | * | 9/2003 | Ouchi et al. | .................. 353/31 |
| 6,646,716 B1 | * | 11/2003 | Ramanujan et al. | .......... 355/67 |

* cited by examiner

*Primary Examiner*—Russell Adams
*Assistant Examiner*—Michael Dalakis
(74) *Attorney, Agent, or Firm*—Thomas, Kayden, Horstemeyer & Risley

(57) ABSTRACT

A power-saving method with integrated photodiode light source. This device has a circuit board with a plurality of red, green and blue photodiodes as the device's light source. Additionally, a light control circuit is used to control light beam from the light source illuminating a reflector and then reflecting to a reflective display panel in order to reflect the light beam and generate an image. Thus, a projection module can project the image on a viewing plate. As cited, the inventive device includes: a light control circuit, a light source module, a polarizing beam splitter (PBS), a reflective display panel and a projection module.

28 Claims, 17 Drawing Sheets

IMAGE PROJECTION DEVICE WITH AN INTEGRATED PHOTODIODE LIGHT SOURCE

CROSS-REFERENCE TO RELATED APPLICATION

This continuation-in-part application is related to and claims the benefit of filing date of a Taiwan patent application which is entitled "Image Projection Device" and which was filed Dec. 21, 2001 as Application Ser. No. 90131751.

BACKGROUND

1. Field of the Invention

The invention relates to an image projection device and more particularly, to an image projection device with integrated photodiode light source.

2. Description of the Related Art

FIG. 1 is a schematic diagram of a typical image projector. As shown in FIG. 1, the typical projector includes a light source module 1, an image module 2 and a projection module 3, wherein module 1 further includes a plural-metal halogen lamp 1a, a lens array 1b an a PS (p-s polarized) converter 1c.

As shown in FIG. 1, in the typical projector, module 1 can effectively convert an unpolarized light beam illuminated by the lamp 1a into a polarized light beam. However, the lamp's F/# limits the size of the light source module so that the entire size of the projector cannot be reduced. Additionally, the lamp in the typical projector consumes major power and generates heat that is a problem in development.

SUMMARY OF THE INVENTION

Accordingly, an object of the invention is to provide an image projection device with an integrated-photodiode light source that uses an integrated photodiode light source (having back-to-back symmetric configuration of photodiodes) as the device's light source. Additionally, a light control circuit is used to control light beam from the light source illuminating a reflector and then reflecting to a reflective display panel in order to reflect the light beam and generate an image. Thus, a projection module can project the image on a viewing plate. The display panel is preferably a liquid-crystal-on-silicon (LCOS) display.

The invention provides an image projection device with an integrated-photodiode light source, and includes a light source module, a polarizing beam splitter, a reflective display panel and a projection module, wherein the light source module uses a plurality of photodiodes as light sources and the display panel is preferably an LCOS display.

A characteristic of the invention is that the light source module includes at least one illuminating unit with a light source of random RGB photodiode arrangement on a circuit board.

Another characteristic of the invention is that the light source module includes a plurality of illuminating units, a polarizing beam splitter, a reflector and a wave-retardation (half-wave) plate.

Another characteristic of the invention is that the light source module includes a plurality of illuminating units, at least one prism and a polarizer, wherein each illuminating unit illuminates an unpolarized light beam and all unpolarized light beams are combined by the prism into a single unpolarized light beam.

Another characteristic of the invention is that the light source module includes a plurality of illuminating units and a photoguider, wherein the photoguider is formed of four reflection mirrors.

A further characteristic of the invention is that a light control circuit is used to control the light source module for the photodiode's illumination, thereby controlling projection quality.

A still further characteristic of the invention is that the photodiodes are symmetrically implemented on both sides of the circuit board 22 mm long, 8.5 mm wide and 0.8 mm thick. Additionally, the light source array is 11.461 mm long, 8.5 mm wide and 1.2 mm thick. In current technologies, each side of the polarizing beam splitters can be less than 13 mm, the LCOS display panel can be 12.5 mm, and the projection module can have a width of 15 mm and a length of 25 mm. As such, the invention can achieve the space requirements for the projection device.

An advantage of the invention is reduced volume and weight of the projection device.

Another advantage of the invention is reduced power consumption and heat generation for the projection device.

DETAILED DESCRIPTION OF THE INVENTION

Similar elements denote the same numbers throughout the description and drawings.

[First Embodiment]

Figure 1:
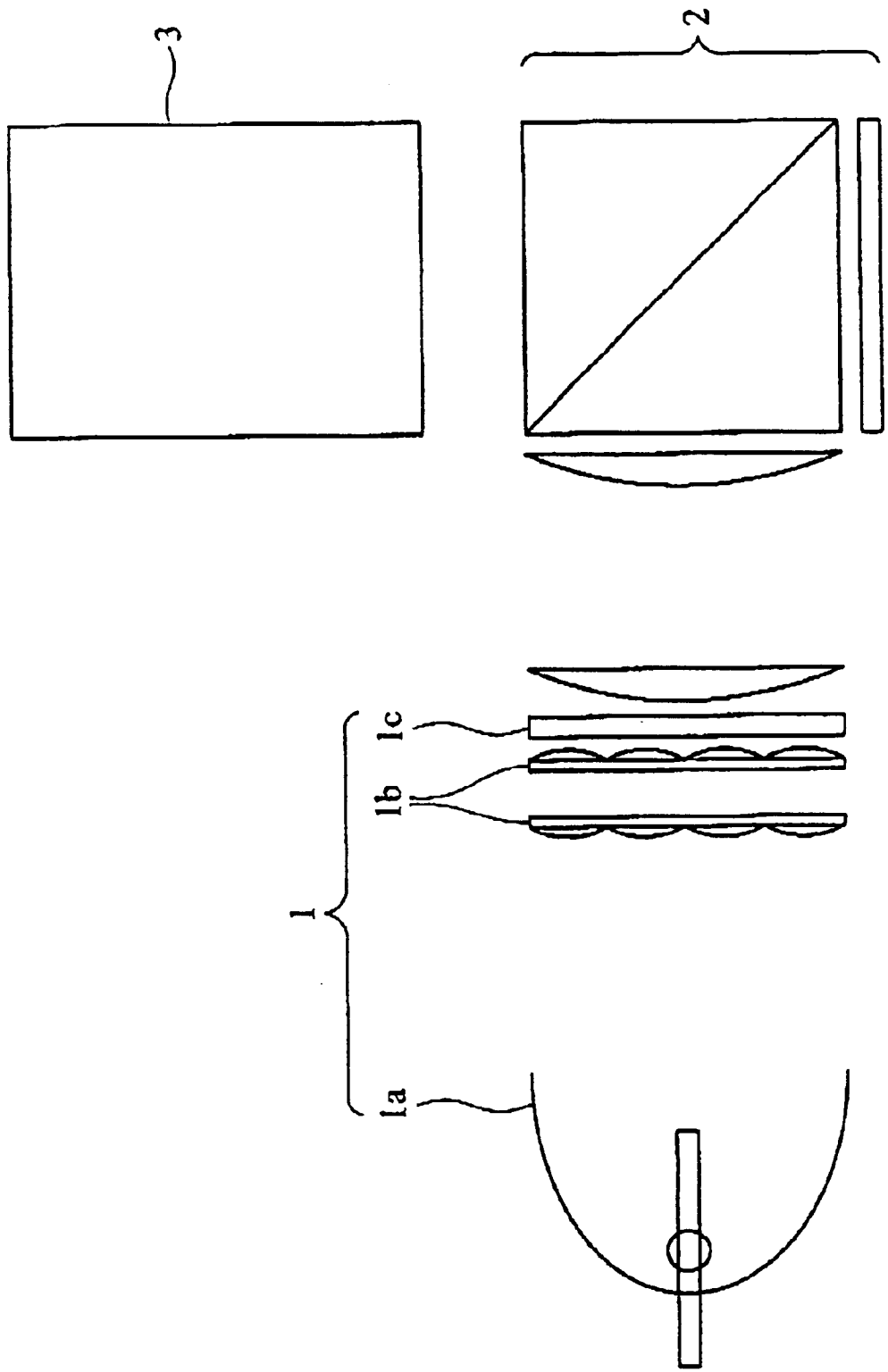
FIG. 1 is a schematic diagram of a typical image projector.
Figure 2:
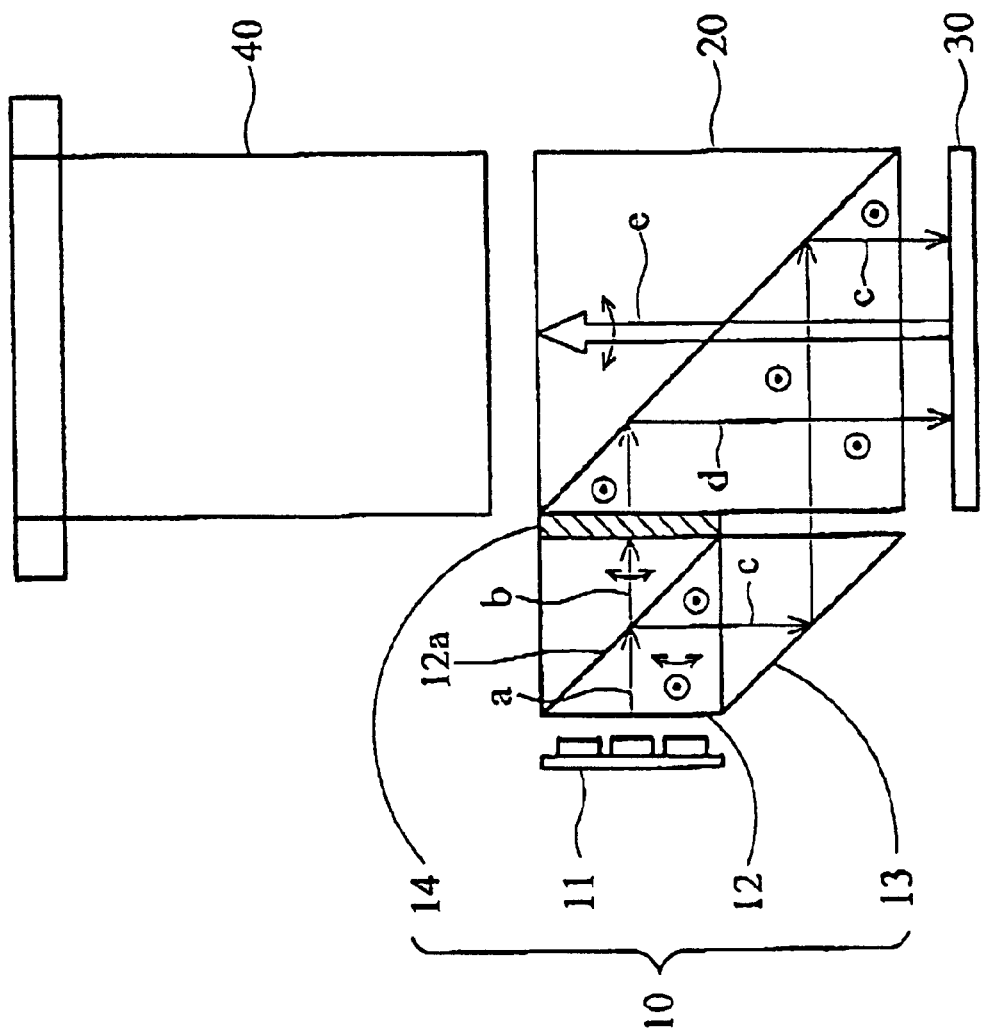
FIG. 2 is a schematic diagram of a first embodiment of an image projection device according to the invention.

FIG. 2 is a schematic diagram of a first embodiment of an image projection device according to the invention. As shown in FIG. 2, the device includes: a light source module 10, a first polarizing beam splitter 20, a reflective display panel 30 and a projection module 40, wherein module 10 uses a semiconductor LED array 11 as a light source.

As shown in FIG. 2, module 10 further includes a second polarizing beam splitter 12, a reflector 13 and a wave-retardation (half-wave) plate 14. The array 11 generates a generally straight light beam a which is unpolarized. The beam a incident on the splitter 12 is split by an interface 12a of the splitter 12 into a p-polarized light beam b and an s-polarized light beam c, wherein the beam b is directly propagated through the interface 12a and the beam c is reflected by the interface 12a. The beam a is further propagated through the plate 14 and converted as an s-polarized light beam d while the beam c is reflected by the reflector 13. The reflector 13 can be, for example, a prism or a reflective mirror.

As shown in FIG. 2, the beams c, d are propagated into and further reflected by the splitter 20 to the panel 30. The panel 30 can be an LCOS display. Next, the beams c, d are reflected and converted by the panel 30 into a p-polarized image light beam e. Finally, the beam e is propagated through the splitter 20 and projected by the module 40 on a viewing plane.

[Second Embodiment]

Figure 3:
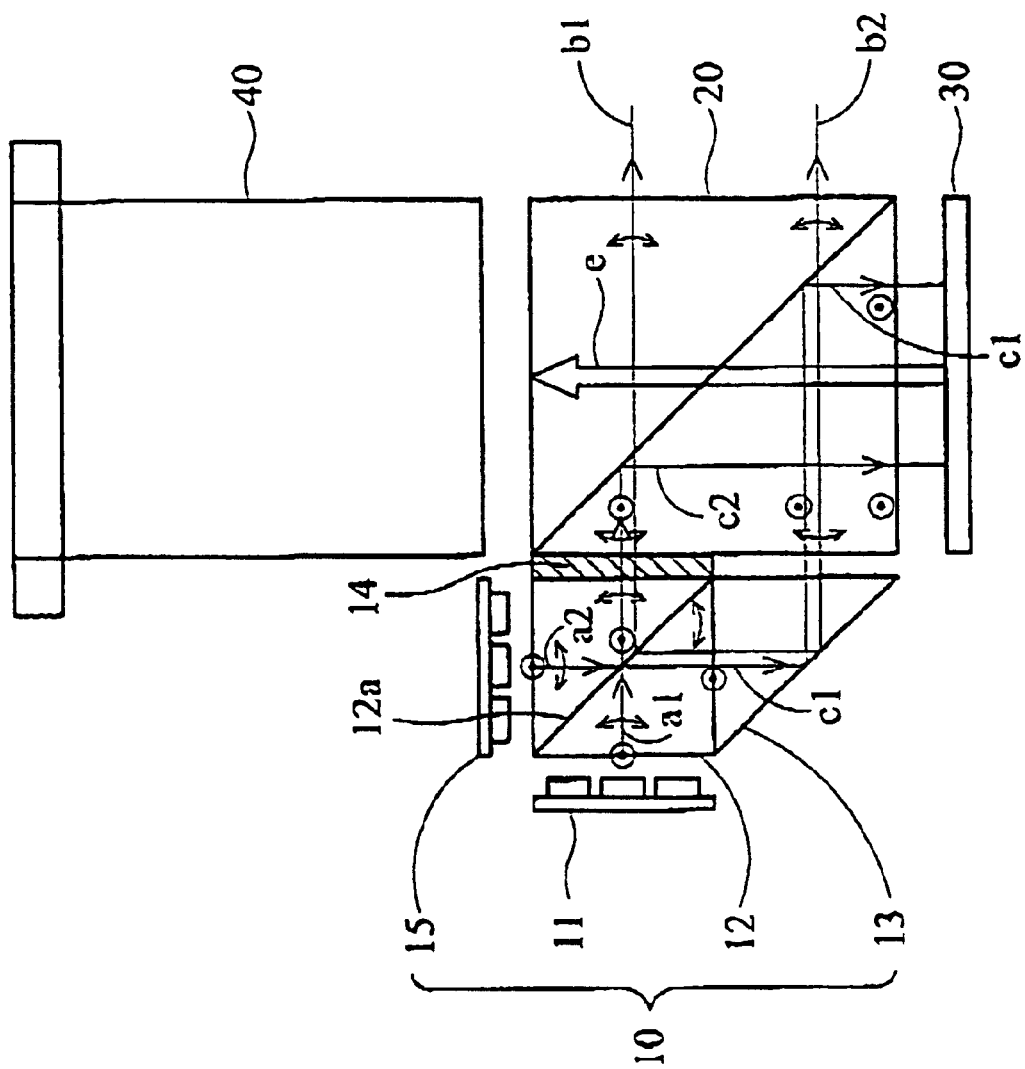
FIG. 3 is a schematic diagram of a second embodiment of the image projection device according to the invention.

FIG. 3 is a schematic diagram of a second embodiment of the image projection device according to the invention. As shown in FIG. 3, the device includes: a light source module 10, a first polarizing beam splitter 20, a reflective display panel 30 and a projection module 40, wherein module 10 uses two semiconductor LED arrays 11, 15 as the light source. As shown in FIG. 3, module 10 further includes a second polarizing beam splitter 12 and a reflector 13. The arrays 11, 15 generate generally straight light beams a1, a2 which are unpolarized. The beam a1 incident on the splitter 12 is split by an interface 12a of the splitter 12 into a p-polarized light beam b1 and an s-polarized light beam c1. The beam b1 is directly propagated through the interface 12a and the splitter 20. The beam c1 is reflected by the interface 12a and the reflector 13. The reflector 13 can be, for example, a prism or a reflective mirror. Also, the beam a2 incident on the splitter 12 is split by the interface 12a of the splitter 12 into a p-polarized light beam b2 and an s-polarized light beam c2. The beam b2 is directly propagated through the interface 12a and reflected by the reflector 13 so as to pass through the splitter 20. The beam c2 is reflected by the interface 12a.

As shown in FIG. 3, the beams c1, c2 are propagated into and further reflected by the splitter 20 to the panel 30. The panel 30 can be an LCOS display. Next, the beams c1, c2 are reflected and converted by the panel 30 into a p-polarized image light beam e. Finally, the beam e is propagated through the splitter 20 and projected by the module 40 on a viewing plane. [Third Embodiment]

Figure 4:
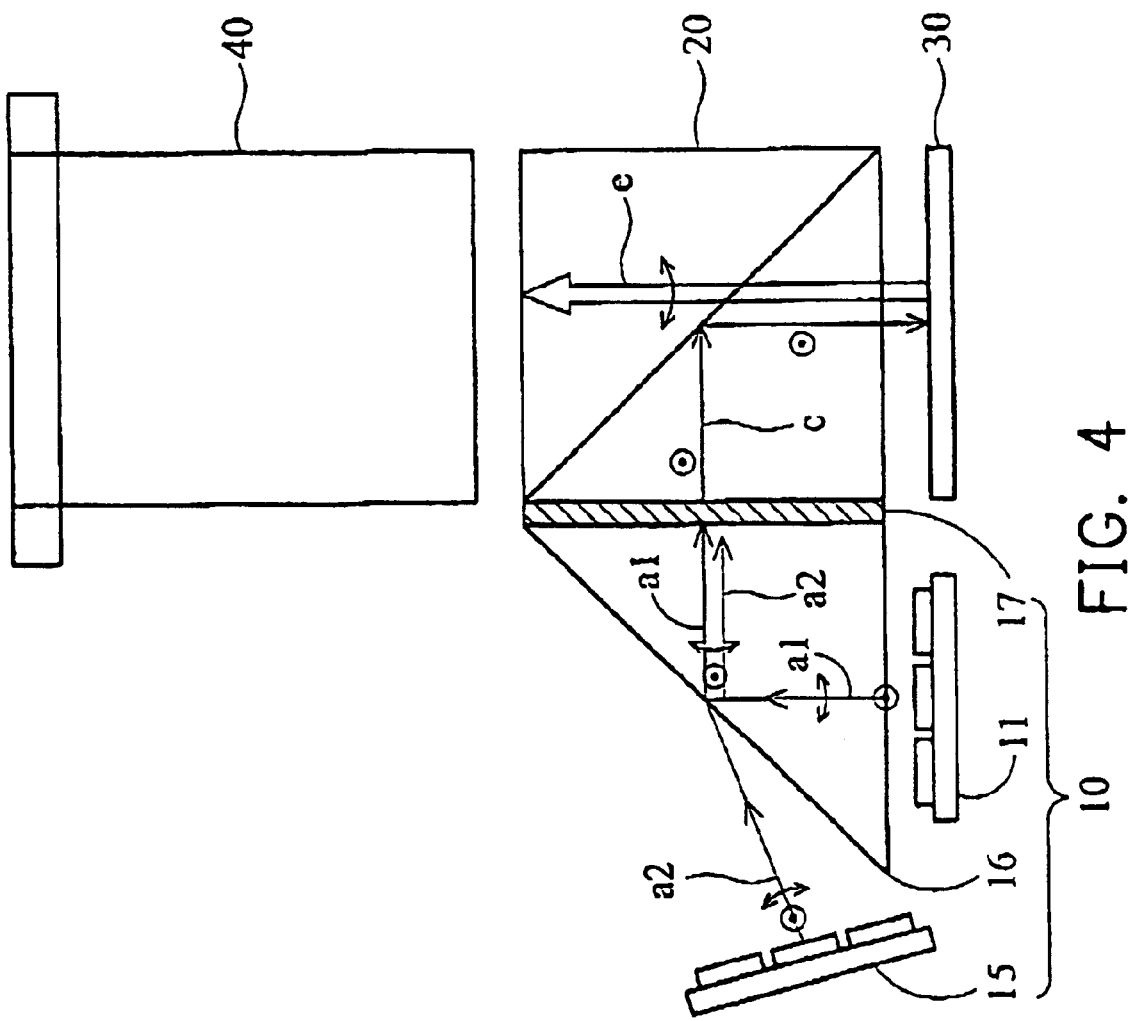
FIG. 4 is a schematic diagram of a third embodiment of the image projection device according to the invention.

FIG. 4 is a schematic diagram of a third embodiment of the image projection device according to the invention. As shown in FIG. 4, the device includes: a light source module 10, a first polarizing beam splitter 20, a reflective display panel 30 and a projection module 40, wherein module 10 uses two semiconductor LED arrays 11, 15 as the light source.

As shown in FIG. 4, module 10 further includes a prism 16 and a polarizer 17. The arrays 11, 15 generate generally straight light beams a1, a2 which are unpolarized. Additionally, the arrays 11, 15 are respectively displaced on two sides of the prism 16. The beam a1 incident on the prism 16 generates full reflection and the beam a2 incident on the prism 16 at a specific angle generates a propagation direction the same as that of the beam a1. Next, the beams a1, a2 are polarized by the polarizer 17 as an s-polarized light beam c. As shown in FIG. 4, the beam c is propagated into and further reflected by the splitter 20 to the panel 30. The panel 30 can be an LCOS display. Next, the beam c is reflected and converted by the panel 30 into a p-polarized image light beam e. Finally, the beam e is propagated through the splitter 20 and projected by the module 40 on a viewing plane.

Figure 5:
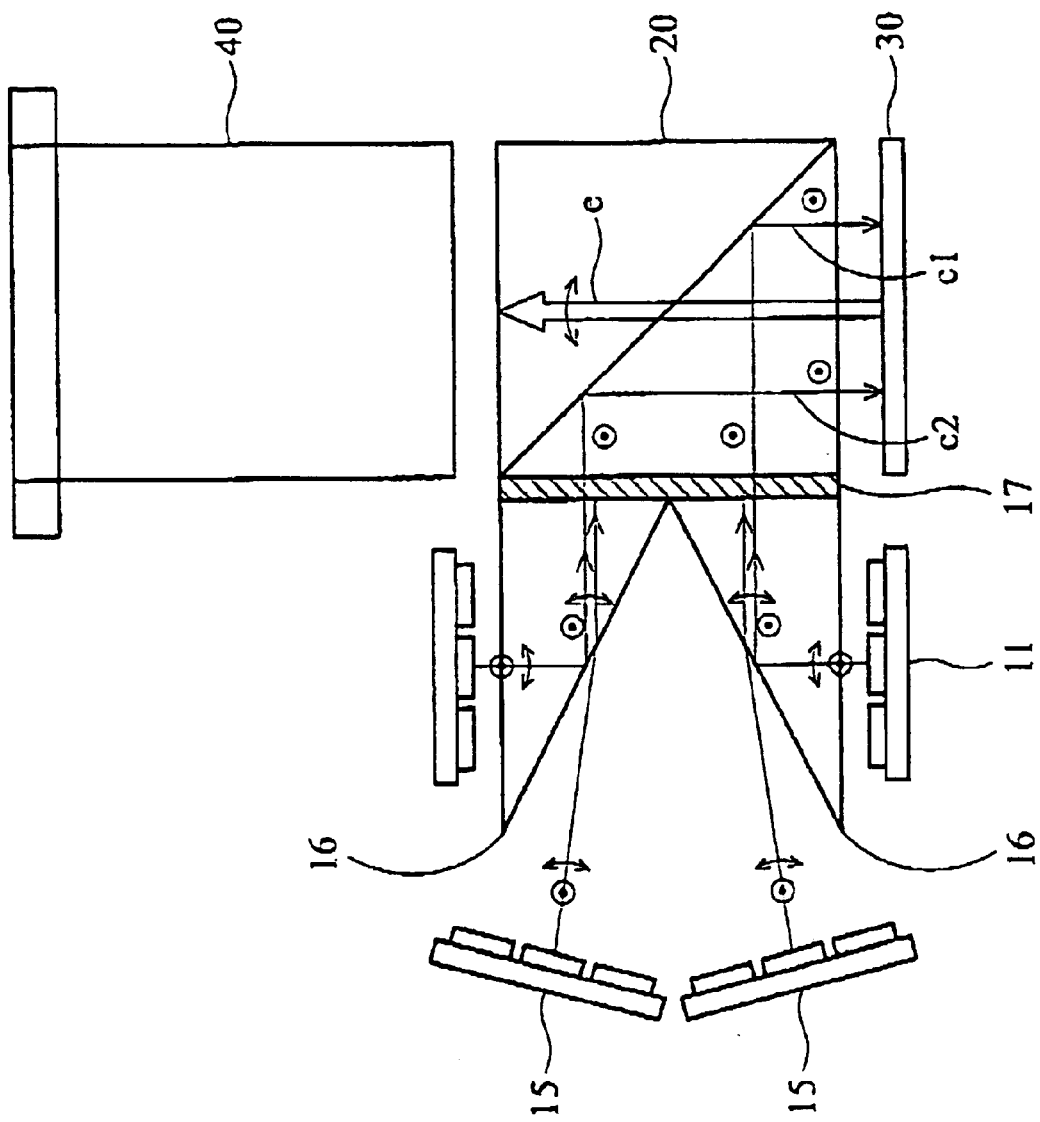
FIG. 5 is a schematic diagram of another form of the third embodiment of the image projection device according to the invention.

FIG. 5 is a schematic diagram of another form of the third embodiment of the image projection device according to the invention. This example is identical to FIG. 4 except that two light source modules are used to increase the projection luminance.

[Fourth Embodiment]

Figure 6:
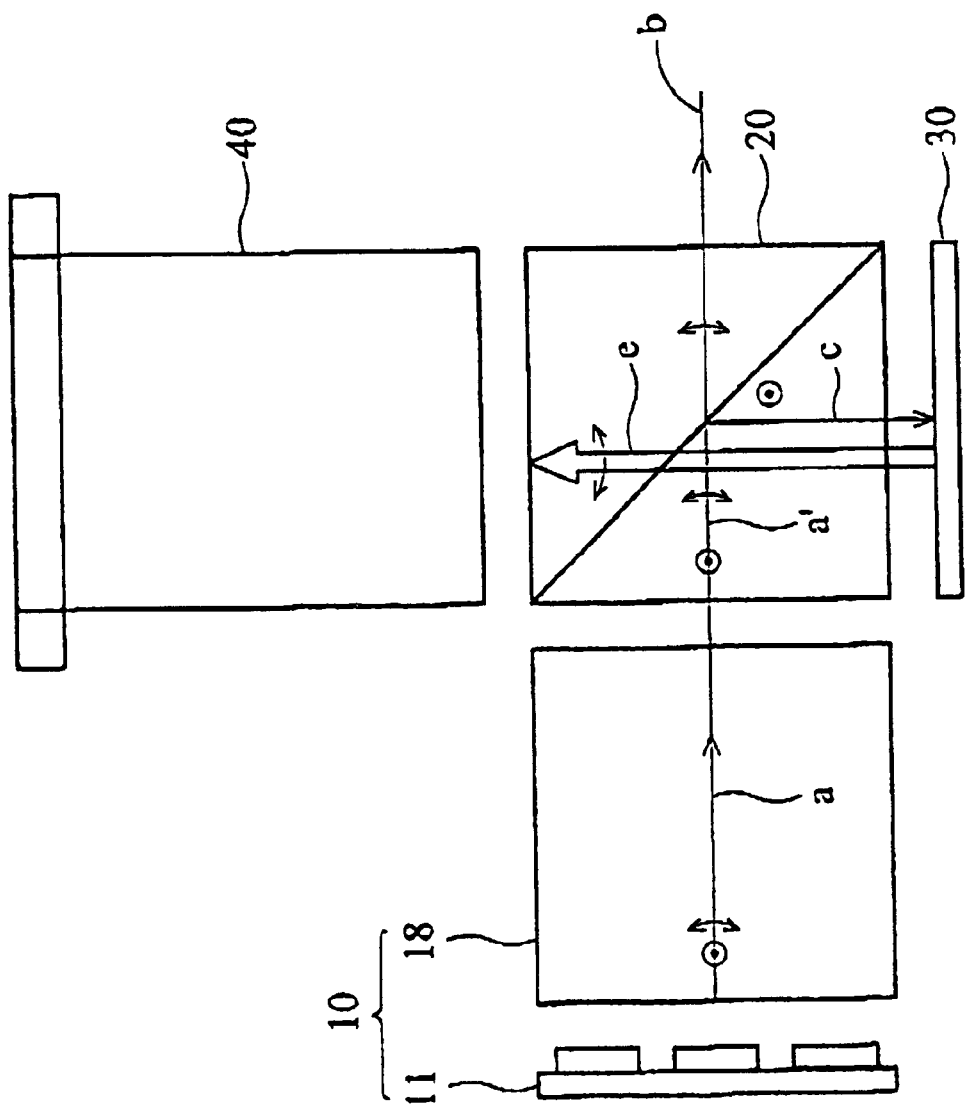
FIG. 6 is a schematic diagram of a fourth embodiment of the image projection device according to the invention.

FIG. 6 is a schematic diagram of a fourth embodiment of the image projection device according to the invention. As shown in FIG. 6, the device includes: a light source module 10, a first polarizing beam splitter 20, a reflective display panel 30 and a projection module 40, wherein module 10 uses a semiconductor LED array 11 as a light source.

As shown in FIG. 6, module 10 further includes a photoguider 18. The photoguider 18 can be a hollow mirror cuboid consisting of four reflective mirrors or a solid glass cube. The array 11 generates an unpolarized light beam a. The beam a incident on the photoguider 18 forms a uniformly unpolarized light beam a.

As shown in FIG. 6, the beam a' is propagated into the splitter 20 and generates a p-polarized light beam b and an s-polarized light beam c. The beam b is propagated directly through an interface of the splitter 20 and the beam c is reflected by the interface. Next, the beam c is reflected by the splitter 20 to the panel 30. The panel 30 can be an LCOS display. Next, the beam c is reflected and converted by the panel 30 into a p-polarized image light beam e. Finally, the beam e is propagated through the splitter 20 and projected by the module 40 on a viewing plane.

In the first to third embodiments of the invention, the first polarizing beam splitter 20 is used to separate the sand p-polarized beams. Further, the splitter 20 guides the s-polarized beam to illuminate on the panel 30.

In all cited embodiments, the arrays are controlled by a light control circuit to emit R, G, B in turn under a stable frequency.

Additional Embodiments:

[Fifth Embodiment]

Figure 7:
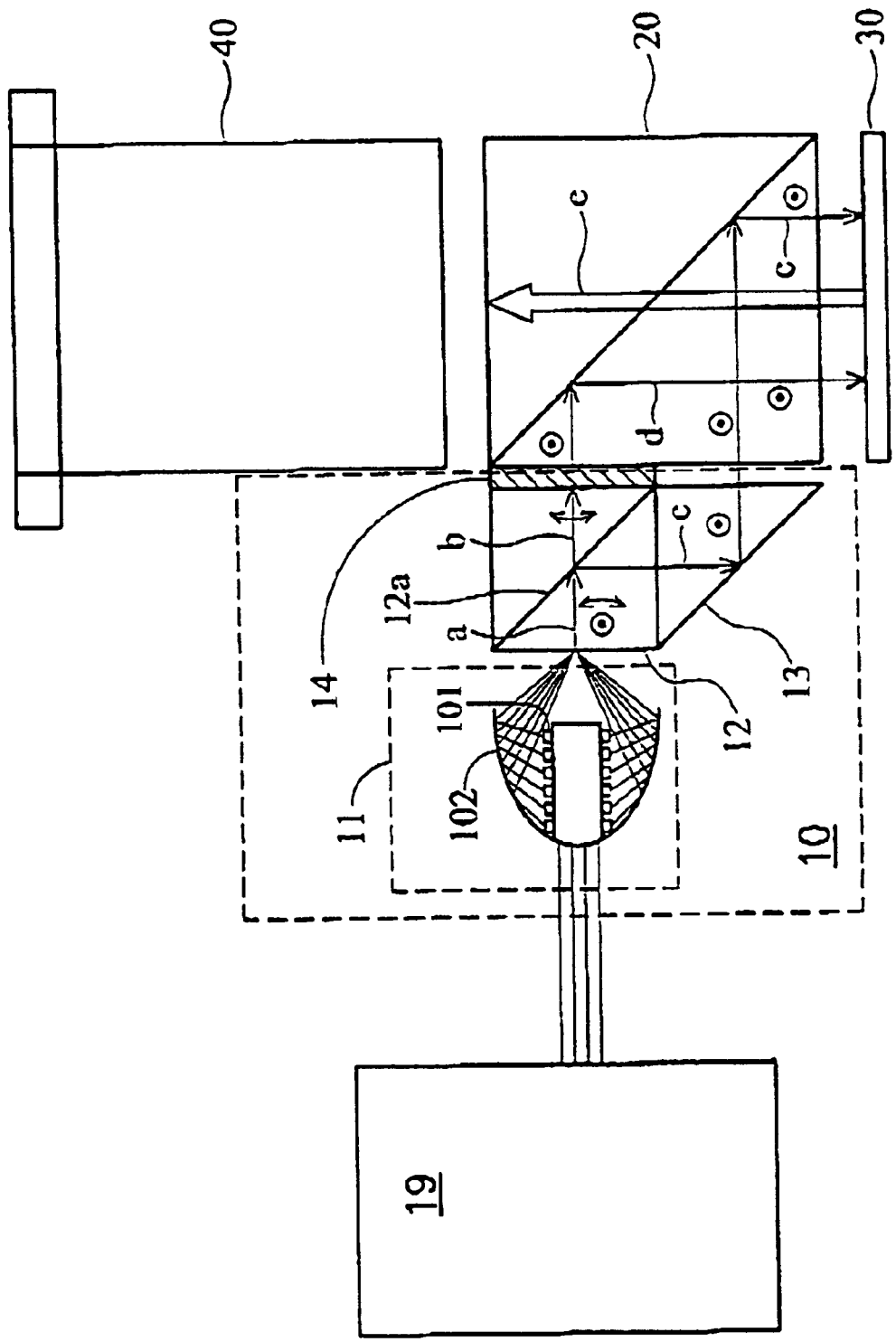
FIG. 7 is a schematic diagram of a fifth embodiment of the image projection device according to the invention.

FIG. 7 is a schematic diagram of a fifth embodiment of the image projection device according to the invention. As shown in FIG. 7, the device includes: a light source module 10, a light control circuit 19, a first polarizing beam splitter 20, a reflective display panel 30 and a projection module 40, wherein module 10 uses an illuminating unit 11' as the light source. The unit 11' has plural photodiodes 101 (described in FIGS. 12 to 14 later) as the required light source, and a shade 102 to collect the intensity of light from the photodiodes 101. The photodiodes can be LEDs. The light source is controlled by the circuit 19 (described in FIGS. 15A to 16).

As shown in FIG. 7, module 10 further includes a second polarizing beam splitter 12, a reflector 13 and a wave-retardation (half-wave) plate 14. The plural photodiodes 101 generate a generally straight unpolarized light beam a through the shade 102. The beam a incident on the splitter 12 is split by an interface 12a of the splitter 12 into a p-polarized light beam b and an s-polarized light beam c, wherein the beam b is directly propagated through the interface 12a and the beam c is reflected by the interface 12a. The beam a is further propagated through the plate 14 and converted as an s-polarized light beam d while the beam c is reflected by the reflector 13. The reflector 13 can be, for example, a photoguider (described in FIG. 11), a prism (described in FIG. 9) or a reflective mirror. As shown in FIG. 7, the beams c, d are propagated into and further reflected by the splitter 20 to the panel 30. The panel 30 can be a TFT-LCD, an LCOS display or an MEM display, wherein the LCOS display is preferred in view of current technique and cost. Next, the beams c, d are reflected and converted by the panel 30 in to a p-polarized image light beame. Finally, the beam e is propagated through the splitter 20 and projected by the module 40 on a viewing plane.

[Sixth Embodiment]

Figure 8:
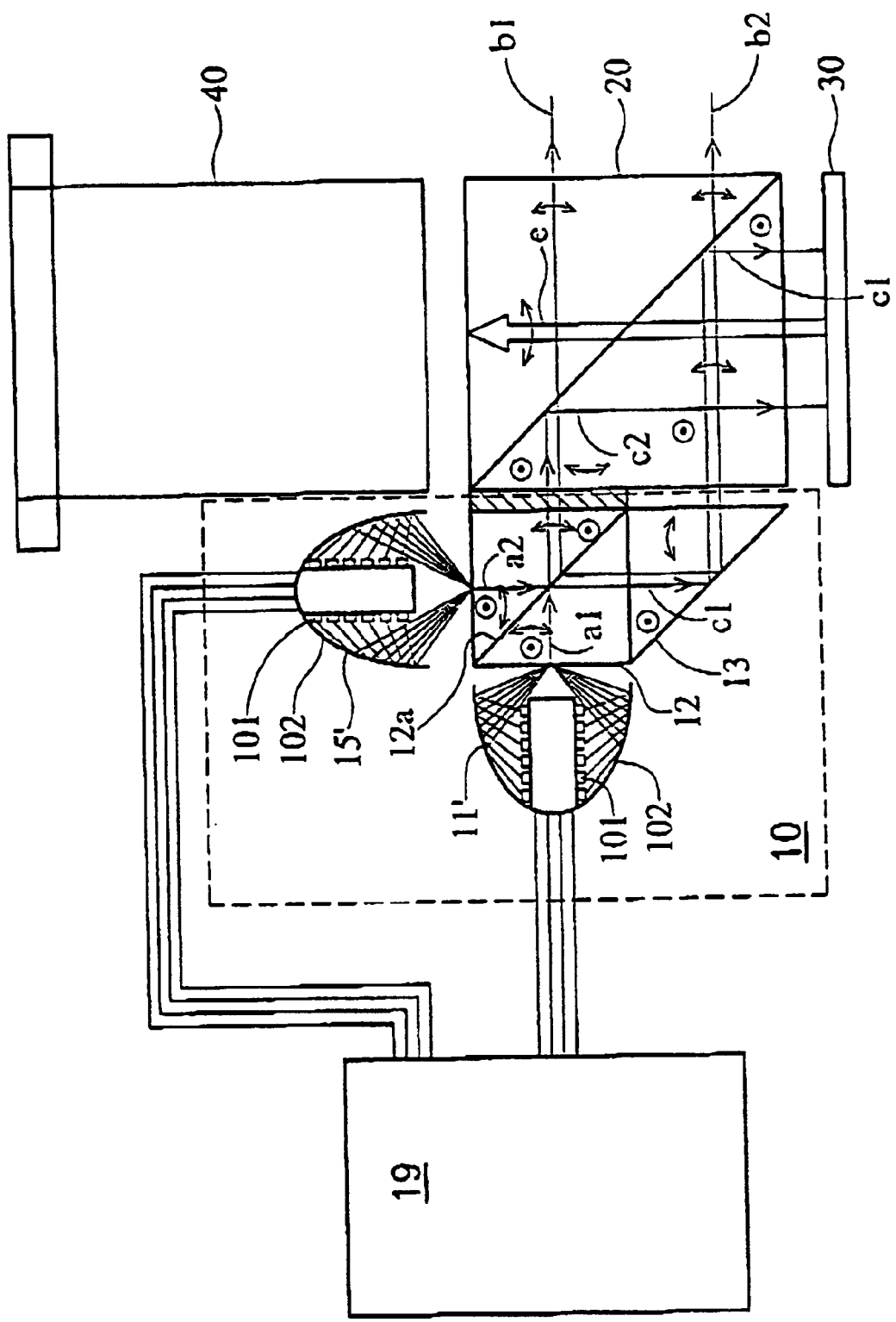
FIG. 8 is a schematic diagram of a sixth embodiment of the image projection device according to the invention.

FIG. 8 is a schematic diagram of a sixth embodiment of the image projection device according to the invention. As shown in FIG. 8, the device includes: a light source module 10, a light control circuit 19, a first polarizing beam splitter 20, a reflective display panel 30 and a projection module 40, wherein module 10 uses two illuminating units 11', 15' in a right-angled configuration as the light source. Each unit 11' or 15' includes plural photodiodes 101 (described in FIGS. 12–14) as the required light source, and a shade 102 to collect the intensity of light from the photodiodes 101. The photodiodes can be LEDs. The light source is controlled by the circuit 19 (described in FIGS. 15A to 16).

As shown in FIG. 8, module 10 further includes a second polarizing beam splitter 12 and a reflector 13. The photodiodes 101 generate generally straight unpolarized light beams a1, a2 through the shade 102. The beam a1 incident on the splitter 12 is split by an interface 12a of the splitter 12 into a p-polarized light beam b1 and an s-polarized light beam c1. The beam b1 is directly propagated through the interface 12a and the splitter 20. The beam c1 is reflected by the interface 12a and the reflector 13. The reflector 13 can be, for example, a photoguider (described in FIG. 11), a prism (described in FIG. 9) or a reflective mirror. Also, the beam a2 incident on the splitter 12 is split by the interface 12a of the splitter 12 into a p-polarized light beam b2 and an s-polarized light beam c2. The beam b2 is directly propagated through the interface 12a and reflected by the reflector 13 so as to pass through the splitter 20. The beam c2 is reflected by the interface 12a.

As shown in FIG. 8, the beams c1, c2 are propagated into and further reflected by the splitter 20 to the panel 30. The panel 30 can be a TFT-LCD, an LCOS display or an MEM display, wherein the LCOS display is preferred in view of current technique and cost. Next, the beams c1, c2 are reflected and converted by the panel 30 into a p-polarized image light beam e. Finally, the beam e is propagated through the splitter 20 and projected by the module 40 on a viewing plane.

[Seventh Embodiment]

Figure 9:
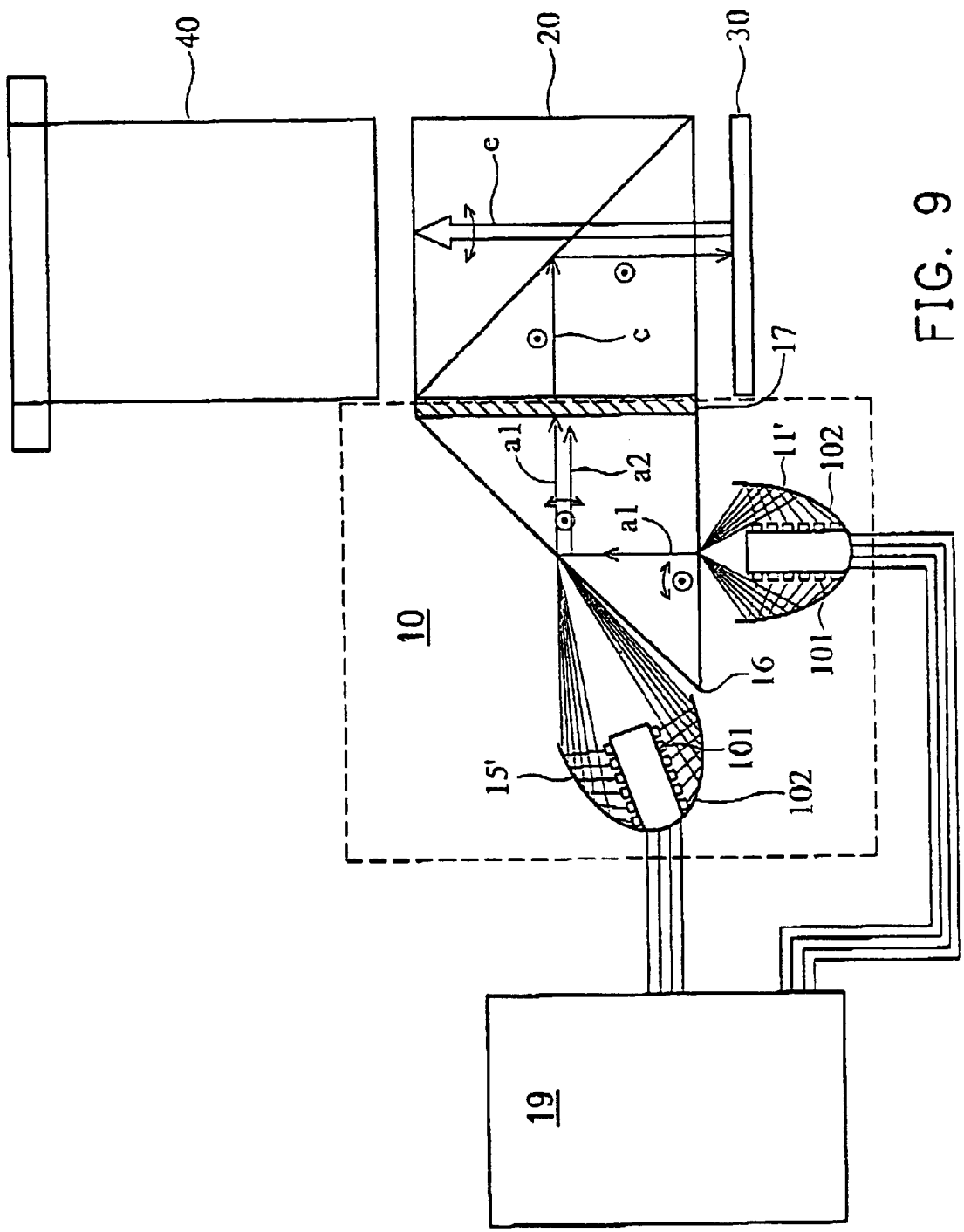
FIG. 9 is a schematic diagram of a seventh embodiment of the image projection device according to the invention.

FIG. 9 is a schematic diagram of a third embodiment of the image projection device according to the invention. As shown in FIG. 9, the device includes: a light source module 10, a light control circuit 19, a first polarizing beam splitter 20, a reflective display panel 30 and a projection module 40, wherein module 10 uses two illuminating units 11', 15' in an acute angle configuration as the light source. Each unit 11' or 15' includes plural photodiodes 101 (described in FIGS. 12–14) as the required light source, and a shade 102 to collect the intensity of light from the photodiodes 101. The photodiodes can be LEDs. The light source is controlled by the circuit 19 (described in FIGS. 15A to 16).

As shown in FIG. 9, module 10 further includes a prism 16 as a reflective and refractive device, and a polarizer 17 with the use of the prism 16. The photodiodes 101 generate generally straight unpolarized light beams a1, a2 through the shade 102. Additionally, the units 11', 15' are respectively displaced on two sides of the prism 16. The beam a1 incident on the prism 16 generates full reflection and the beam a2 incident on the prism 16 in a specific angle generates a propagation direction the same as that of the beam a1. Next, the beams a1, a2 are polarized by the polarizer 17 as an s-polarized light beam c.

As shown in FIG. 9, the beam c is propagated into and further reflected by the splitter 20 to the panel 30. The panel 30 can be a TFT-LCD, an LCOS display or an MEM display, wherein the LCOS display is preferred in view of current technique and cost. Next, the beam c is reflected and converted by the panel 30 into a p-polarized image light beam e. Finally, the beam e is propagated through the splitter 20 and projected by the module 40 on a viewing plane.

Figure 10:
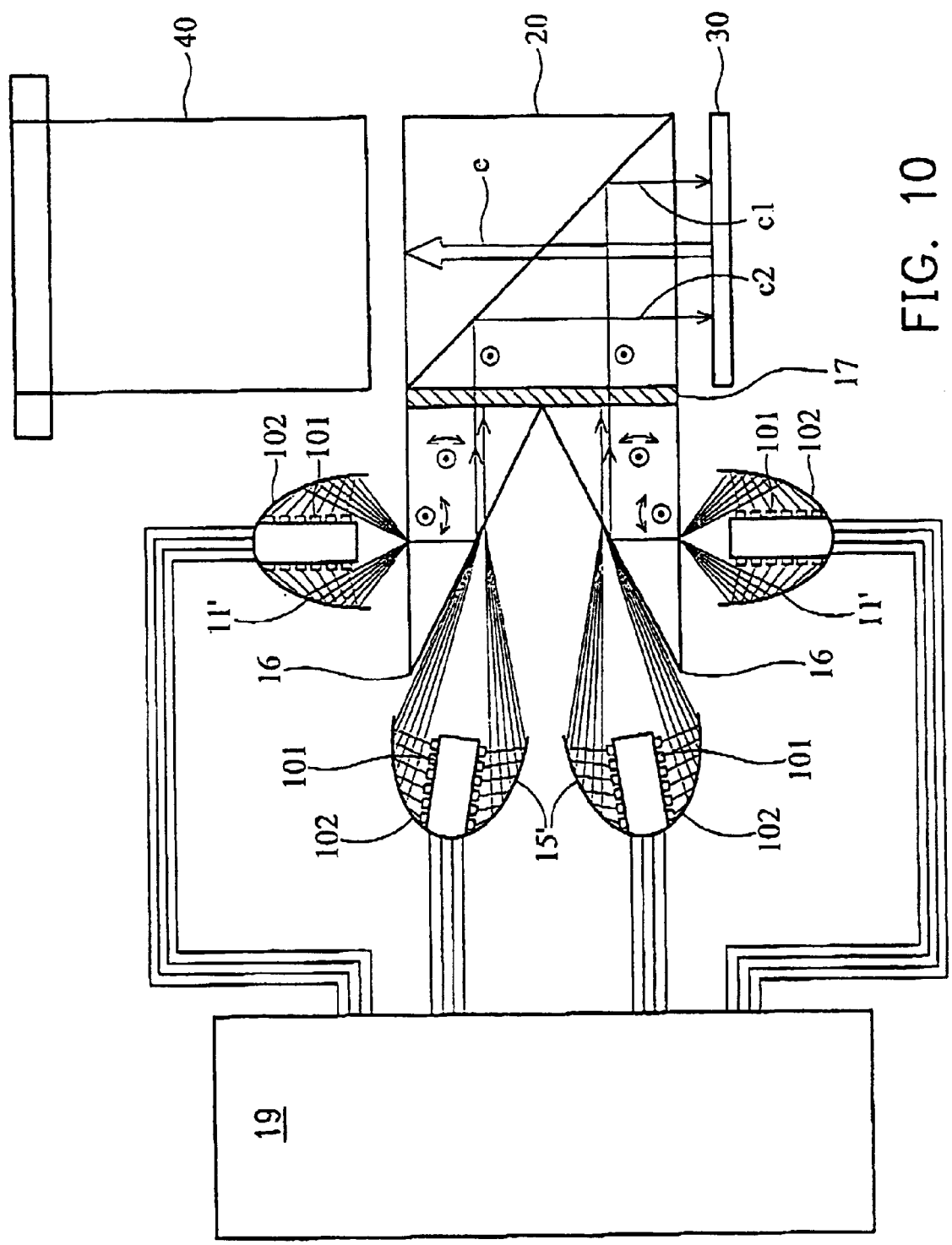
FIG. 10 is a schematic diagram of another form of the seventh embodiment of the image projection device according to the invention.

FIG. 10 is a schematic diagram of another form of the seventh embodiment of the image projection device according to the invention. This example is identical to FIG. 9 except that two light source modules are used to increase the projection luminance. The two light source modules represent four illuminating units as configured in FIG. 10.

[Eighth Embodiment]

Figure 11:
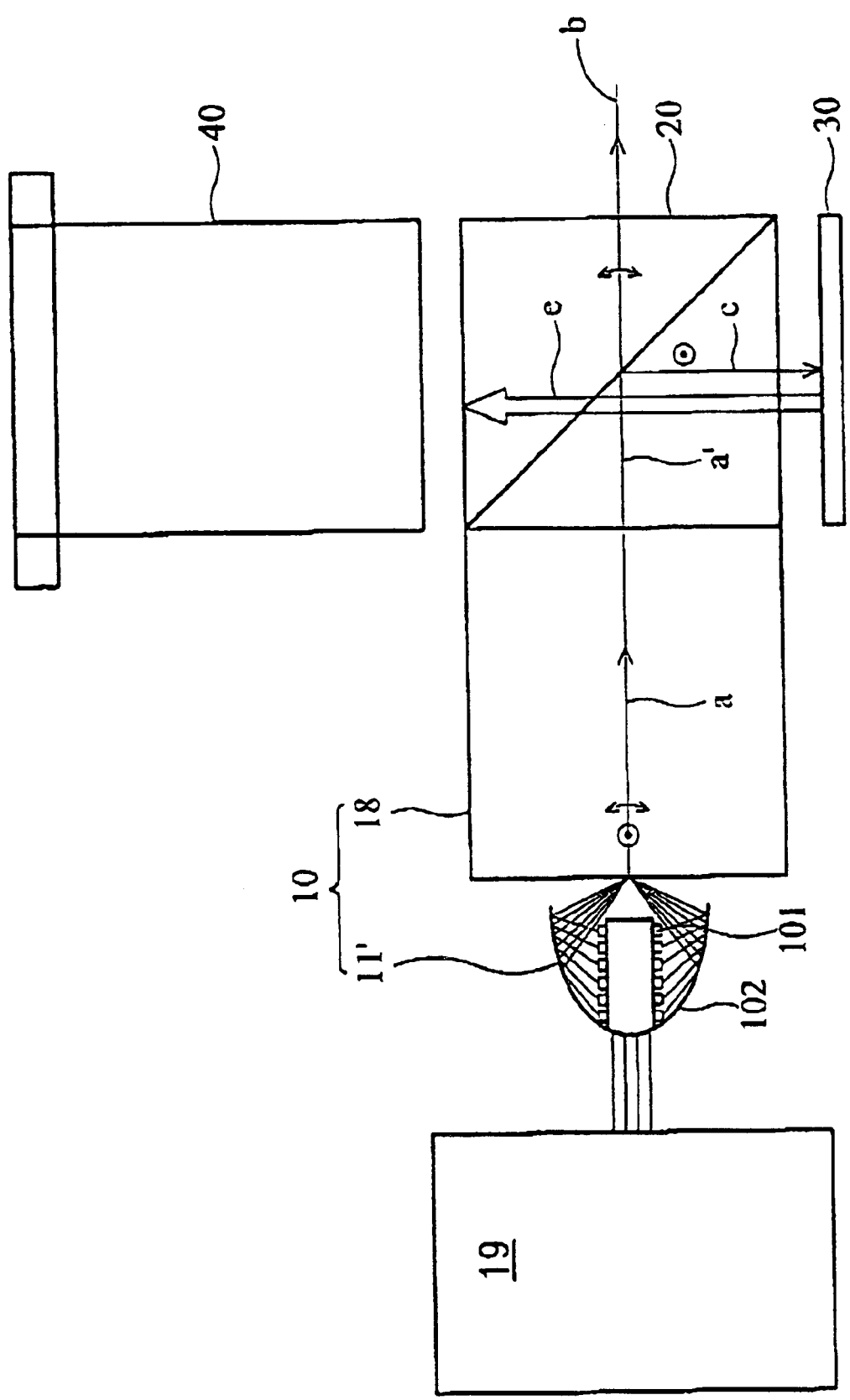
FIG. 11 is a schematic diagram of an eighth embodiment of the image projection device according to the invention.

FIG. 11 is a schematic diagram of an eighth embodiment of the image projection device according to the invention. As shown in FIG. 11, the device includes: a light source module 10, a light control circuit 19, a first polarizing beam splitter 20, a reflective display panel 30 and a projection module 40, wherein module 10 uses an illuminating unit 11' as the light source. The unit 11' has plural photodiodes 101 (described in FIGS. 12 to 14 later) as the required light source, and a shade 102 to collect the intensity of light from the photodiodes 101. The photodiodes can be LEDs. The light source is controlled by the circuit 19 (described in FIGS. 15A to 16).

As shown in FIG. 11, module 10 further includes a photoguider 18 as the reflector. The photoguider 18 can be a hollow mirror cuboid consisting of four reflective mirrors, or a solid glass cube. The photodiodes 101 generate an unpolarized light beam a through the shade 102. The beam a incident on the photoguider 18 forms a uniformly unpolarized light beam a'.

As shown in FIG. 11, the beam a' is propagated into the splitter 20 and generates a p-polarized light beam b and an s-polarized light beam c. The beam b is propagated directly through an interface of the splitter 20 and the beam c is reflected by the interface. Next, the beam c is reflected by the splitter 20 to the panel 30. The panel 30 can be a TFT-LCD, an LCOS display or an MEM display, wherein the LCOS display is preferred in view of current technique and cost. Next, the beam c is reflected and converted by the panel 30 into a p-polarized image light beam e. Finally, the beam e is propagated through the splitter 20 and projected by the module 40 on a viewing plane.

In the fifth to seventh embodiments of the invention, the first polarizing beam splitter 20 is used to separate the sand p-polarized beams. Further, the splitter 20 guides the s-polarized beam to illuminate on the panel 30.

[Light Source]

Figure 12:
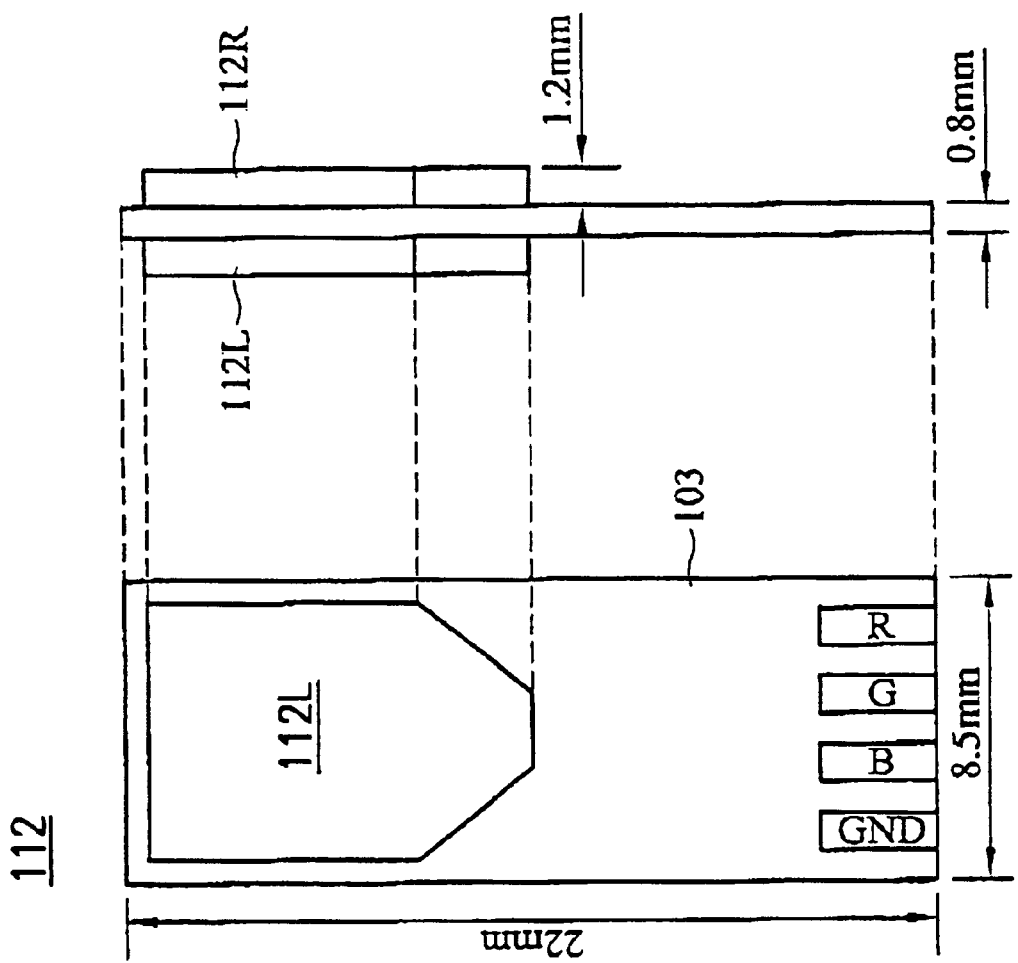
FIG. 12 is a schematic diagram of an illuminating unit according to the invention.
Figure 15A:
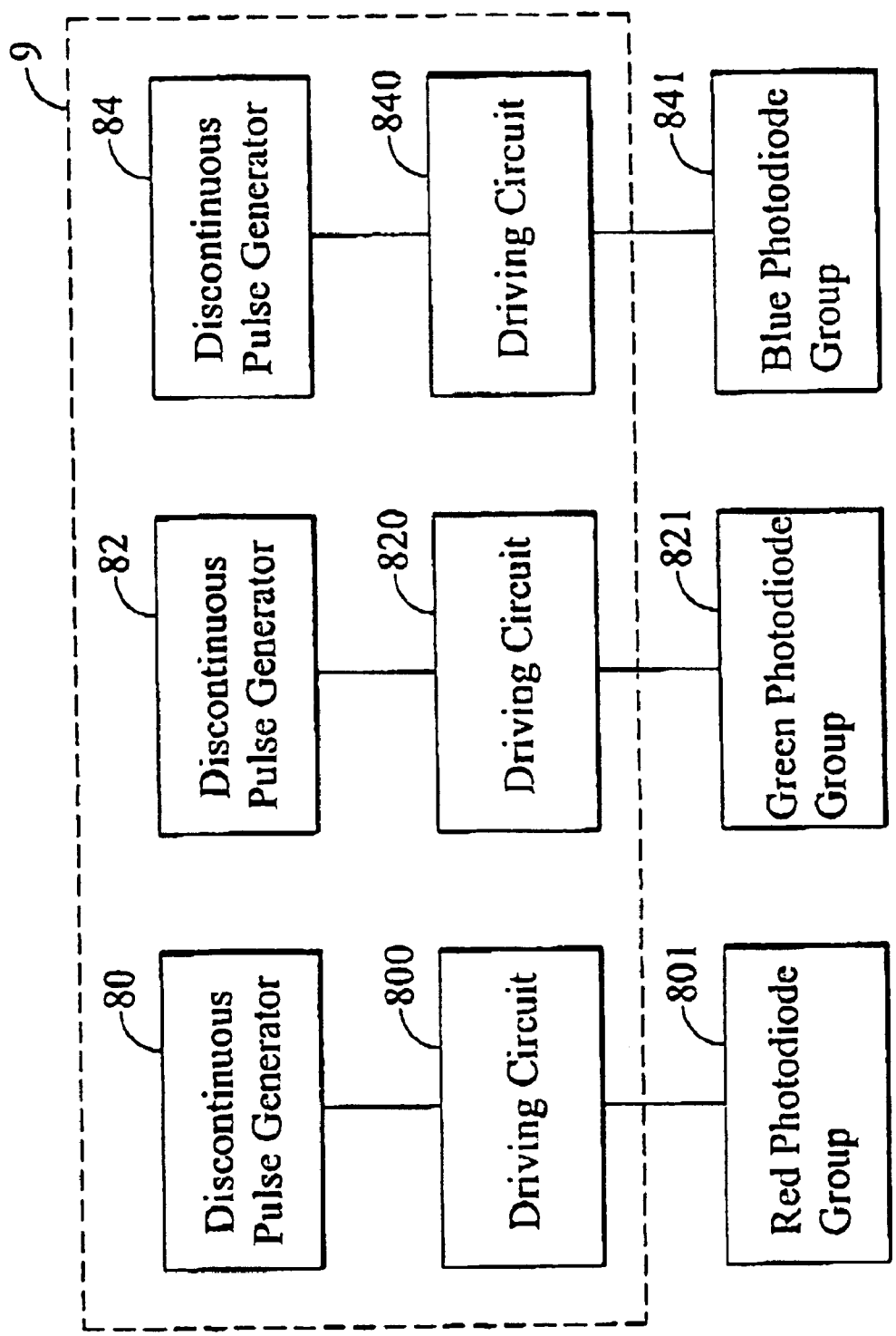
FIG. 15A is a schematic diagram of an embodiment of a light control circuit in conjunction with FIG. 14 according to the invention.

FIG. 12 is a schematic diagram of an illuminating unit according to the invention. For the illuminating units 11' or 15' used to the embodiments, the photodiodes are implemented on one or two sides of a circuit board 103. As shown in FIG. 12, for example, the circuit board 103 has two photodiode groups 112L, 112R and four metallization pads R, G, B, GND coupled between the groups 112L, 112R and the light control circuit 19 (FIGS. 15A–16). The group 112L is implemented on one side of the circuit board 103 and the group 112R is implemented on the other side opposite to the group 112L. Additionally, the pad R is for the photodiodes with red light, the pad G is for the photodiodes with green light, the pad B is for the photodiodes with blue light and the pad GND is commonly for the ground.

An example of the group 112L is described in detail for simplicity in view of symmetric configuration of the illuminating units.

Figure 13:
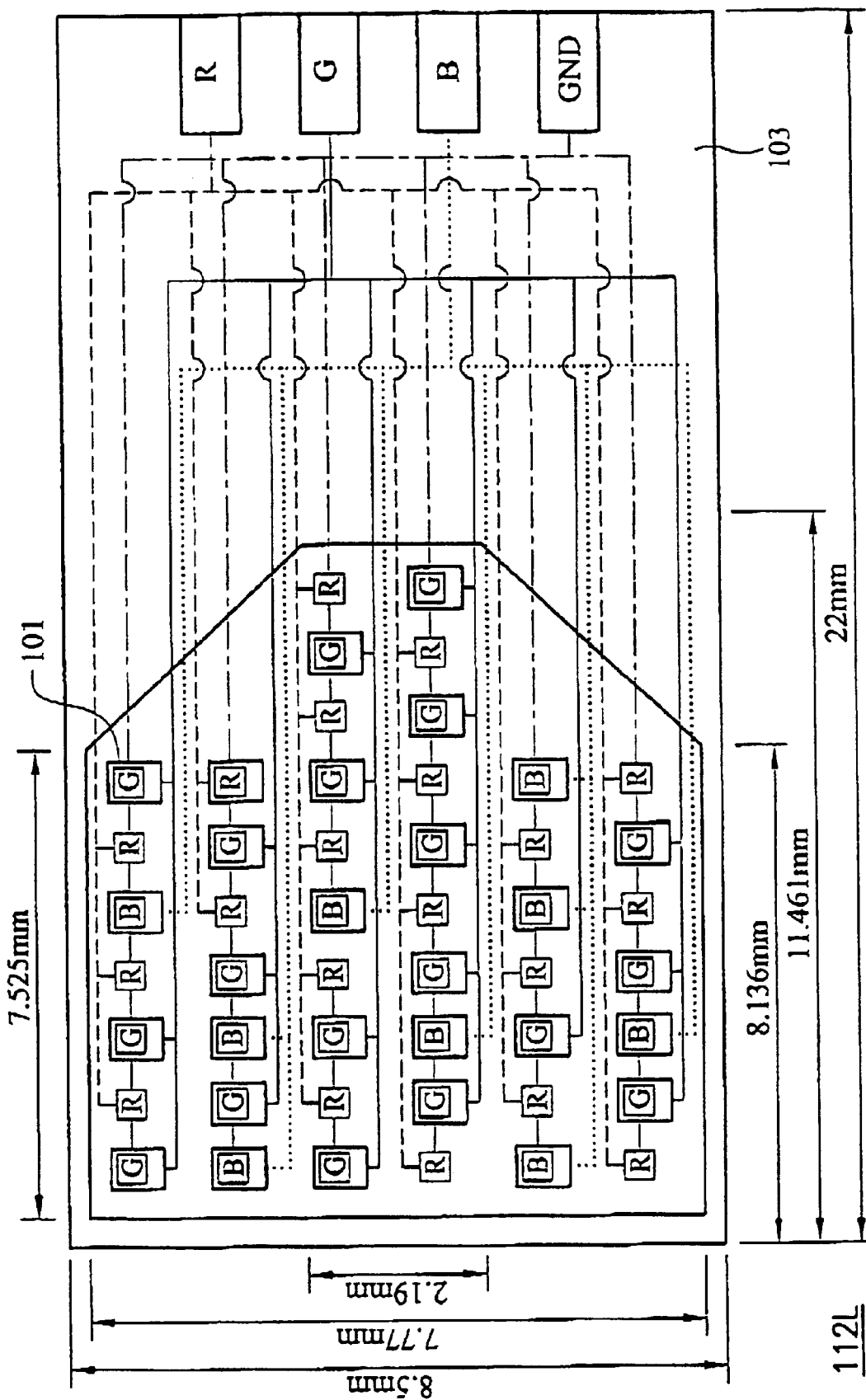
FIG. 13 is a partially detailed diagram of an embodiment of FIG. 12 according to the invention.
Figure 14:
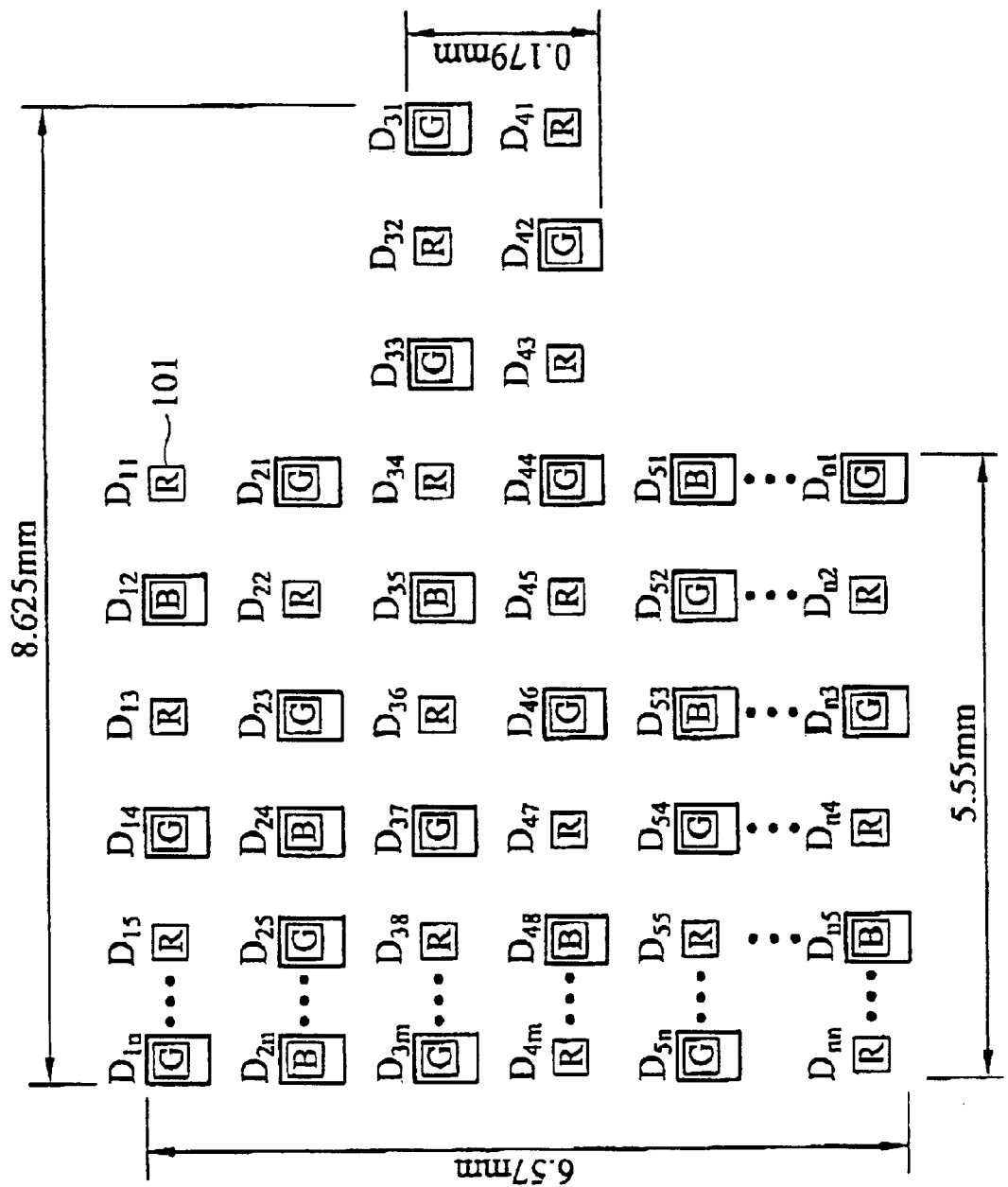
FIG. 14 is a partially detailed diagram of another form of the embodiment of FIG. 12 according to the invention.

FIGS. 13 and 14 are two embodiments of the group 112L in FIG. 12 according to the invention. In practice, red-light, blue-light and green-light dies 101 are implemented on the board 103 in any arrangement that can illuminate uniformly integrated red, blue and green light, as shown in FIGS. 13 and 14.

As shown in FIGS. 13 and 14, the group 112L was symmetrically arranged in the board 103 with a length of 22 mm, a width of 8.5 mm and a thickness of 0.8 mm. Occupied area of the group 112L can be varied as desired and with physical room, for example, the occupied area is different in FIGS. 13 and 14. Additionally, for current fabricating technique, the side of the splitter 20 can obtain a lateral length of about 13 mm, the size of the panel 30 is up to 12.5 mm and the module 40 can obtain a length of about 25 mm and a width of about 15 mm. As cited, the inventive device can achieve space requirements.

As shown in FIG. 13, in this embodiment, when two 2×7 photodiode arrays are in the top and the bottom and one 2×10 photodiode array is in the middle, a like-lateral T profile is formed. As shown in FIG. 14, in this embodiment, when two 2×6 photodiode arrays are in the top and the bottom and one 2×9 photodiode array is in the middle, a like-lateral T profile is also formed. The red, green and blue photodiodes respectively adopted DL-AV0001 LEDs, DL-AV0002 and DL-AV0003 Zener diodes sold by Delta Electronics Inc., based on cost and photo-utility.

Figure 15B:
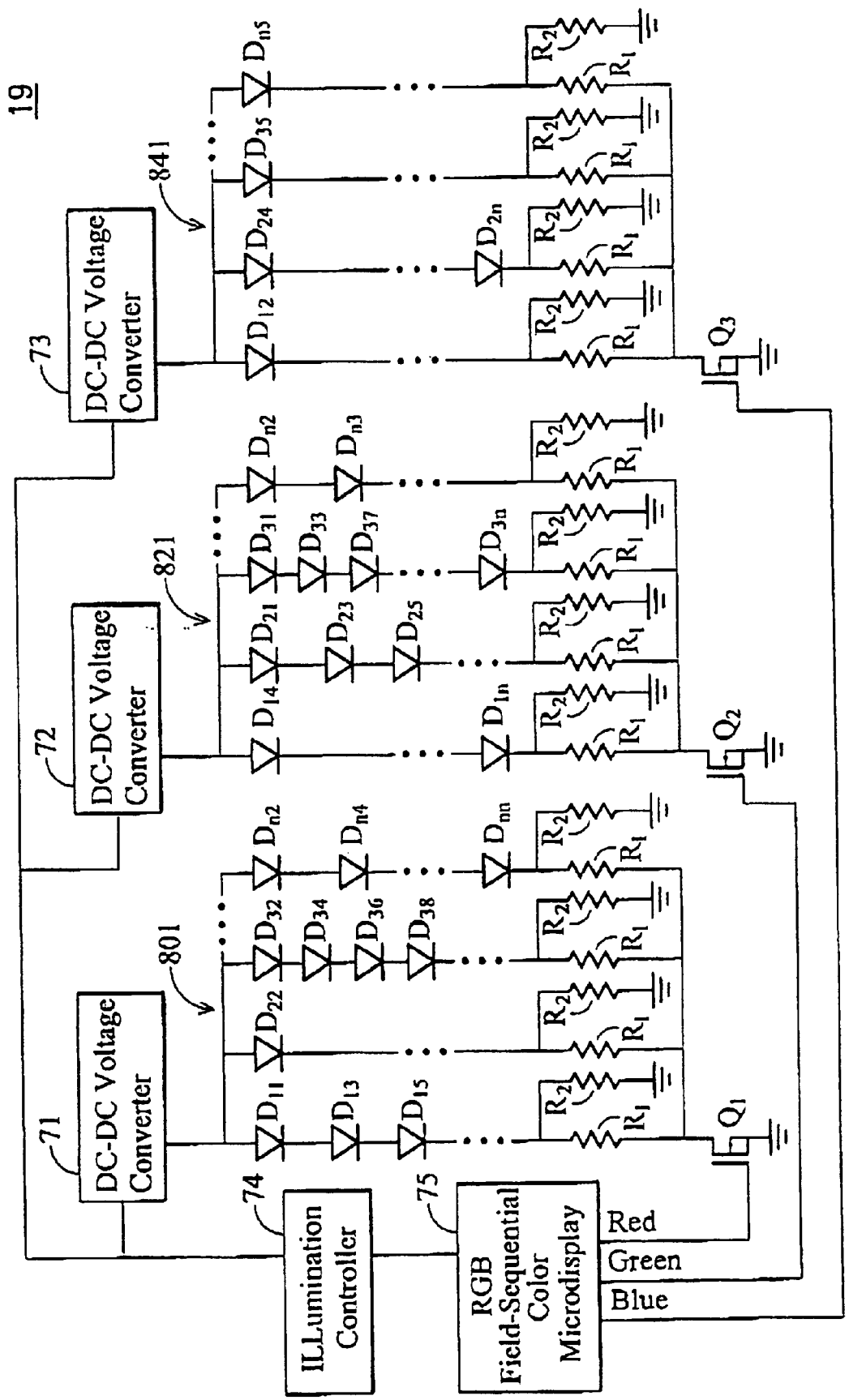
FIG. 15B is a schematic diagram of another form of the embodiment of the light control circuit in conjunction with FIG. 14 according to the invention.
Figure 16:
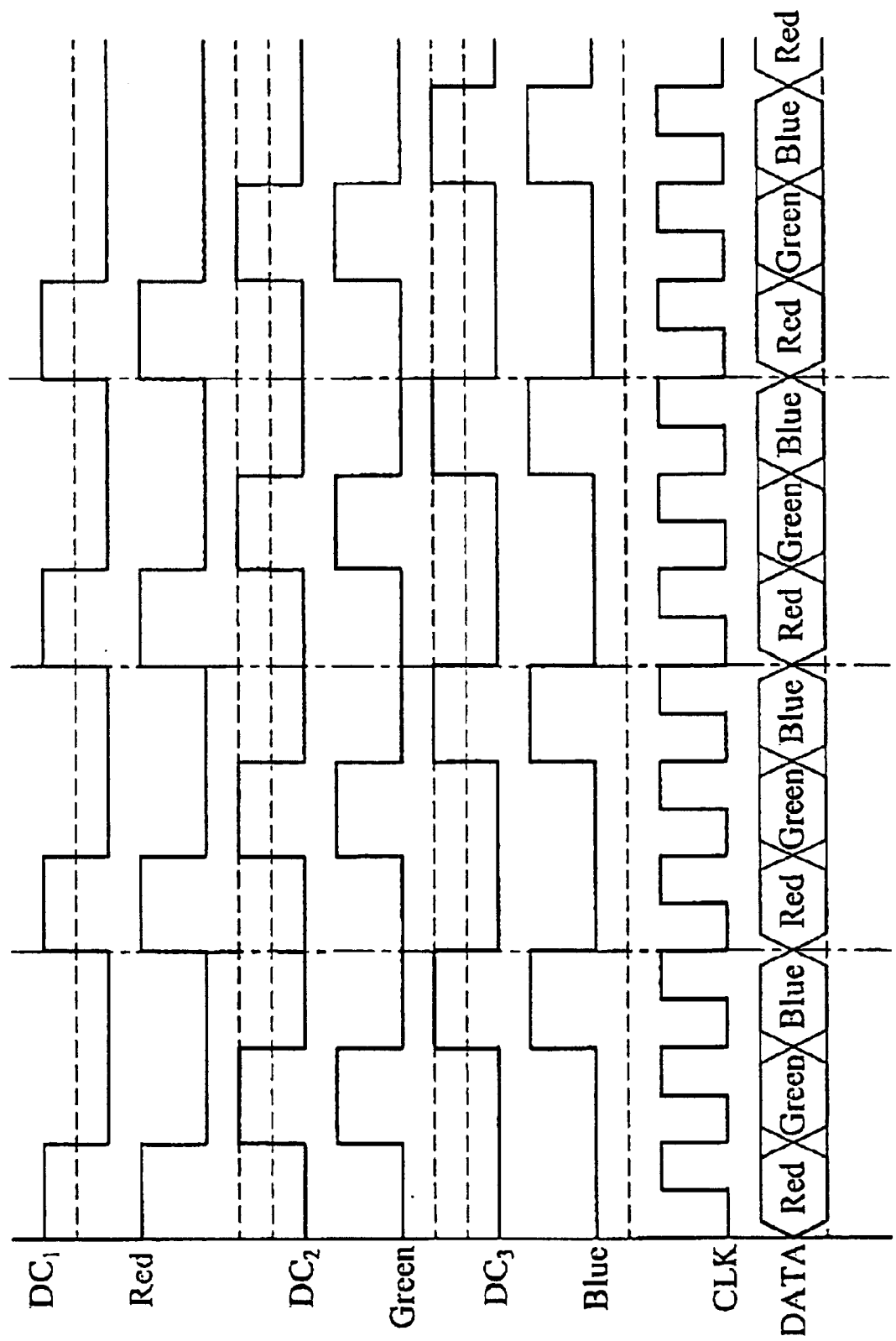
FIG. 16 is a timing diagram of FIG. 15B according to the invention.

As shown in FIG. 13, in this embodiment, the same color light photodiodes are electrically connected in series as a group by a wire to the respective pad (described in FIGS. 15A and 15B). For example, the connected red photodiodes are connected to the pad R, the connected green photodiodes are connected to the pad G, and the connected blue photodiodes are connected to the pad B. Additionally, all photodiodes are connected in series to the pad GND to avoid circuit errors. All pads are connected to the circuit 19 for light control, which is described in detail in FIGS. 7–11.

[Light Control Circuit]

FIG. 15A is a schematic diagram of an embodiment of the light control circuit 19 in conjunction with FIG. 14 according to the invention. As shown in FIG. 15A, the circuit 19 essentially includes: three discontinuous pulse generators (80, 82, 84) and three driving circuits (800, 820, 840). The light control circuit 19 drives and control RGB photodiode groups (red photodiode group 801, green photodiode group 821, blue photodiode group 841) for illumination. The discontinuous pulse generators (80, 82, 84) generate pulses in turn. The outputs of the generators (80, 82, 84) are electrically connected to the driving circuits (800, 820, 840), respectively. The outputs of the driving circuits (800, 820, 840) are electrically connected to the RGB groups (801, 821, 841) in order to sequentially illumination of red, green, blue photodiodes as an image. The image is projected on a viewing plane to form a color image due to persistence of vision when viewed.

FIG. 15B is a schematic diagram of another form of the embodiment of the light control circuit in conjunction with FIG. 14 according to the invention. As shown in FIG. 15B, the light control circuit essentially includes: three DC—DC voltage converter 71–73, an RGB field-sequential color microdisplay 75 (this can be CMD8X6DDI Field Sequential Control ASIC produced by Three Five System, Inc.) and three MOSFET switches Q1–Q3. The circuit 19 can further include an illumination controller 74 in front of the microdisplay 75 to control the luminance of the photodiodes 101.

FIG. 16 is a timing diagram of FIG. 15B according to the invention. As shown in FIG. 16 with reference to FIG. 15B, the microdisplay 75 outputs Red, Green, Blue pulses. The pulses are electrically connected to gates of the switches Q1–Q3 one to one. Sources of the switches Q1–Q3 are grounded. Drains of the switches Q1–Q3 are respectively connected to one side of at least one resistor R1. The other side of the resistor R1 is connected to the reverse side of a relative cascade photodiode group. For example, the switch Q1 is connected to the reverse side of the red photodiode group 801 through the relative resistor R1; the switch Q2 is connected to the reverse side of the green photodiode group 821 through the relative resistor R1; and the switch Q3 is connected to the reverse side of the blue photodiode group 841 through the relative resistor R1. Every group is connected to a specific DC—DC voltage converter. In this embodiment, the group 801 is connected to the converter 71, the group 821 is connected to the converter 72, and the group 841 is connected to the converter 73. The converters 71–73 consistent with the relative RGB pulses drive the corresponding photodiode groups 801, 821, 841 to sequentially illuminate. A DC voltage Vin is supplied to the converters 71–73 and the controller 74. The output of the controller 74 (adopted CMD3XLB Illumination Controller produced by Three Five System, Inc.) is electrically connected to the input of the microdisplay 75.

As shown in FIG. 15B, an explanation is given with reference to FIG. 14. Each of the groups 801, 821 and 841 has a separate operating voltage provided by the connected converters 71–73, as cited above.

Additionally, the controller 74 connected to the microdisplay 75 sequentially controls the luminance of the RGB photodiodes 101 using the prior pulse width modulation (PWM) technique and the resulting pulses are output to the microdisplay 75. The microdisplay 75 changes the output frequency CLK according to the received pulses with different pulse widths to adjust a rate of data bus DATA to the switches Q1–Q3. Therefore, the photodiode groups 801, 821, 841 continuously and sequentially illuminate lights Red, Green, Blue as desired. The switches can be MOSFETs.

The cited photodiodes 101 are wired with same color photodiodes (i.e., LEDs) as a group with plural cascade rows even though the same color photodiodes are not arranged adjacent to each other in the light source modules or illuminating units. For example, the first row in FIG. 14 includes the group 801 of red LEDs $D_{11}, D_{13}, D_{15}, \ldots$, the group 821 of blue LEDs $D_{12}, \ldots$, and the group 841 of green LEDs $D_{11}, \ldots D_{1n}$; the second row includes the group 801 of red LEDs $D_{22}, \ldots$, the group 821 of blue LEDs $D_{24}, \ldots, D_{22}$, and the group 841 of green LEDs $D_{21}, D_{23} D_{25}, \ldots$; and so on. All photodiodes are connected commonly to the pad GND for the ground. All the same color rows are connected in parallel as a color group. Therefore, the RGB groups are formed as shown in the circuits 801, 821, 841 of FIG. 15B.

As shown in FIG. 15B, the DC—DC voltage converters 71–73 provide the operating voltage by converting a cell voltage of 5V into the desired voltage of 12V. Instead of the converters 71–73, AC-DC converters (not shown) can be used to provide the groups 801, 821, 841 with the operating voltage as required.

These modifications can be made to the invention in light of the above detailed description. The terms used in the following claims should not be construed to limit the invention to the specific embodiment disclosed in the specification and the claims. Rather, the scope of the invention is to be determined entirely by the following claims, which are to be construed in accordance with established doctrines of claim interpretation.

What is claimed is:

1. An image projection device with integrated photodiode light source, comprising:
    a light source module, which further comprises:
        at least one pair of semiconductor photodiode arrays to respectively illuminate a first unpolarized light beam and a second unpolarized light beam, wherein semiconductor photodiode is an LED,
        a prism to fully reflect the first unpolarized light beam and conduct the second unpolarized light beam in a specific incidence such that the first and second unpolarized beams are propagated in the same direction, and
        a polarizer to convert the first and second unpolarized beams into a first polarized light beam;
    a first polarizing beam splitter, implemented on one side of the polarizer, to reflect the first polarized light beam;
    a reflective display panel to receive the first polarized light beam reflected by the first polarizing beam splitter and convert the received first polarized light beam into a first polarized image light beam; and
    a projection module to project the first polarized image light beam.

2. The image projection device of claim 1, wherein the panel is an LCOS display.

3. An image projection device with integrated photodiode light source, comprising:
    a light source module, which further comprises:
        a semiconductor photodiode array to illuminate an unpolarized light beam, wherein the semiconductor photodiode array is an LED array,
        a second polarizing beam splitter to split the unpolarized light beam as a first type polarized light beam and a second type polarized light beam,
        a wave-retardation plate to convert the second type polarized light beam into a converted first type polarized light beam, and
        a reflector to reflect the first polarized light beam such that the first and the first converted polarized light beams are propagated in the same direction;
    a first polarizing beam splitter to reflect the first and the first converted polarized light beams;
    a reflective display panel to receive the first and the first converted polarized light beams reflected by the first polarizing beam splitter and convert the received first and the first converted polarized light beams into a second type polarized image light beam; and
    a projection module to project the second type polarized image light beam.

4. The image projection device of claim 3, wherein the reflector is a prism or a reflective mirror.

5. The image projection device of claim 3, wherein the panel is an LCOS display.

6. An image projection device with integrated photodiode light source, comprising:
    a light source module, which further comprises:
        a first semiconductor photodiode array to illuminate a first unpolarized light beam, wherein the first semiconductor photodiode array is an LED array,
        a second semiconductor photodiode array to illuminate a second unpolarized light beam, wherein the second semiconductor photodiode array is an LED array,
        a second polarizing beam splitter to respectively convert the first unpolarized light beam and the second unpolarized light beam into first type and second polarized light beams and then reflect each of the first type polarized light beams, and
        a reflector to reflect the first type polarized light beam of the second semiconductor photodiode array such that the first polarized light beams are propagated in the same direction;
    a first polarizing beam splitter to reflect the first polarized light beams;
    a reflective display panel to receive the first polarized light beams reflected by the first polarizing beam splitter and convert the received first polarized light beams into a second type polarized light beam; and
    a projection module to project the second type polarized light beam.

7. The image projection device of claim 6, wherein the reflector is a prism or a reflective mirror.

8. The image projection device of claim 6, wherein the panel is an LCOS display.

9. An image projection device with integrated photodiode light source, comprising:
    a light source module having at least one illuminating unit, a second polarizing beam splitter and at least one reflector,
    wherein the at least one illuminating unit has a plurality of three primary color LEDs on a circuit board as three primary color groups, the second polarizing beam splitter splits light beams from the at least one illuminating unit as a first type polarized light beam and a second type polarized light beam and reflects the first type polarized light beam to the reflector, and the reflector receives the first type polarized light beam;
    a light control circuit having:
        at least one discontinuous pulse generator to generate three sets of pulses electrically connected to the groups one-to-one, and
        three driving circuits respectively connected between the pulse generator and the groups, having a common input terminal to receive the pulses generated by the pulse generator and three separate output terminal to drive the respectively connected groups to illuminate light beams in turn;
    a first polarizing beam splitter to receive the first type polarized light beam reflected by the reflector,
    a reflective display panel to receive the first type polarized light beam reflected by the first polarizing beam splitter and convert the received first type polarized light beam into a second type polarized image light beam; and
    a projection module to project the second type polarized image light beam.

10. The image projection device of claim 9, wherein the three primary color LEDs are red LEDs, green LEDs and blue LEDs.

11. The image projection device of claim 9, further comprising a half wave implemented between the first and second polarizing beam splitters, to convert the second type polarized light beam polarized by the second polarizing beam splitter into a converted first polarized light beam incident on the first polarizing beam splitter to increase light beams reflected by the first polarizing beam splitter to the panel.

12. The image projection device of claim 9, wherein two sides of the circuit board respectively implement a plurality of LEDs and a shade laterally covers the two sides of the circuit board such that lights emitted by the LEDs is collected and reflected to the reflector.

13. An image projection device with integrated photodiode light source, comprising:
   a light source module having at least one illuminating unit, a second polarizing beam splitter and at least one reflector,
   wherein the at least one illuminating unit has a plurality of three primary color photodiodes on a circuit board as three primary color groups, the second polarizing beam splitter splits light beams from the at least one illuminating unit as a first type polarized light beam and a second type polarized light beam and reflects the first type polarized light beam to the reflector, and the reflector receives the first type polarized light beam;
   a light control circuit having:
      a three primary field-sequential color microdisplay having three output terminals to output three differently discontinuous pulses, respectively,
      three switch circuits having three input terminals connected to the outputs of the microdisplay one-to-one to receive the discontinuous pulses and three output terminals connected to one side of the three groups one-to-one, and
      three DC supply circuits respectively connected to the other side of the three groups one-to-one to supply an operating voltage to the groups and the microdisplay;
   a first polarizing beam splitter to receive the first type polarized light beam reflected by the reflector;
   a reflective display panel to receive the first type polarized light beam reflected by the first polarizing beam splitter and convert the received first type polarized light beam into a second type polarized image light beam; and
   a projection module to project the second type polarized image light beam.

14. The image projection device of claim 13, wherein the three primary color photodiodes have red, green and blue lights.

15. The image projection device of claim 13, further comprising a half-wave plate implemented between the first and second polarizing beam splitters, to convert the second type polarized light beam polarized by the second polarizing beam splitter into a convened first polarized light beam incident on the first polarizing beam splitter to increase light beams reflected by the first polarizing beam splitter to the panel.

16. The image projection device of claim 13, wherein two sides of the circuit board respectively implement the plurality of photodiodes and a shade laterally covers the two sides of the circuit board such that lights emitted by the photodiodes is collected and reflected to the reflector.

17. The image projection device of claim 13, wherein the panel is an LCOS display.

18. The image projection device of claim 13, wherein the panel is a TFT-LCD.

19. The image projection device of claim 13, wherein the panel is an MEM display.

20. The image projection device of claim 13, wherein the photodiodes have red LEDs to generate red light and zener diodes to generate green light and blue light.

21. An image projection device with integrated photodiode light source, comprising:
   a light source module having at least one illuminating unit and at least one reflector, wherein the at least one illuminating unit has a plurality of RGB photodiodes on a circuit board as RGB groups, and the reflector receives light beams illuminated by the groups;
   a light control circuit having:
      at least one discontinuous pulse generator to generate three sets of pulses electrically connected to the groups one-to-one, and
      three driving circuits respectively connected between the pulse generator and the groups, having a common input terminal to receive the pulses generated by the pulse generator and three separate output terminal to drive the respectively connected groups to illuminate light beams in turn;
   a first polarizing beam splitter to receive light beams reflected by the reflector; and
   a reflective display panel to receive light beams reflected by the first polarizing beam splitter as a first polarized light beam and convert the first polarized light beam into a polarized image light beam.

22. The image projection device of claim 21, wherein two sides of the circuit board respectively implement the plurality of photodiodes, and a shade laterally covers the two sides of the circuit board such that light emitted by the photodiodes is collected and reflected to the reflector.

23. The image projection device of claim 21, wherein when the reflector is a prism, a polarizer is further used to convert an unpolarized light beam generated by the photodiodes and reflected by the prism into the first polarized light beam.

24. The image projection device of claim 21, wherein the first polarized light beam is an s-polarized beam.

25. The image projection device of claim 21, wherein the reflector is a photoguider formed by four reflective mirrors.

26. The image projection device of claim 21, wherein the panel is a TFT-LCD.

27. The image projection device of claim 21, wherein the panel is an MEM display.

28. The image projection device of claim 21, wherein the photodiodes have red LEDs to generate red light and zener diodes to generate green light and blue light.

\* \* \* \* \*